Figure 1:
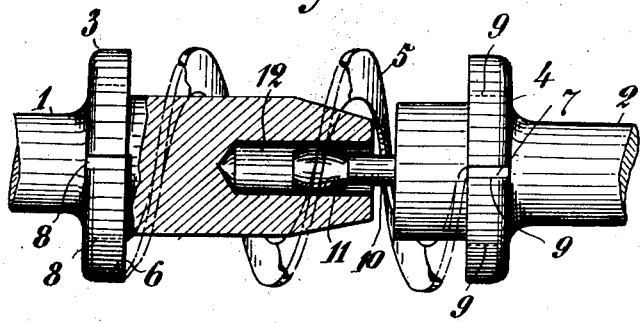

P. A. FISKER.
UNIVERSAL COUPLING.
APPLICATION FILED OCT. 30, 1918.

1,331,748.

Patented Feb. 24, 1920.

Inventor
Peder Andersen Fisker
By [signature]
Attorney

UNITED STATES PATENT OFFICE.

PEDER ANDERSEN FISKER, OF FREDERIKSBERG, NEAR COPENHAGEN, DENMARK.

UNIVERSAL COUPLING.

1,331,748.  Specification of Letters Patent.  Patented Feb. 24, 1920.

Application filed October 30, 1918. Serial No. 260,326.

*To all whom it may concern:*

Be it known that I, PEDER ANDERSEN FISKER, manufacturer, subject of the Kingdom of Denmark, residing at No. 30 Peder Bangsvy, Frederiksberg, near Copenhagen, Denmark, have invented certain new and useful Improvements in Universal Couplings, of which the following is a specification.

This invention relates to universal couplings, and more particularly to couplings in which the connecting means for the shaft ends comprise coil springs.

A feature of this invention is the provision of a ball-and-socket joint, approximately midway of the distance between the ends of the springs, for guiding one of the shafts in its movement relative to the other shaft.

Another feature is the provision of a joint of the above-described character which also permits one of the shafts to move longitudinally forward or away from the other shaft.

Still another feature is the provision of improved means for mounting the springs on the shaft-ends.

The drawing illustrates one manner of constructing the invention.

Figure 1 shows the coupling in side-elevation and partly in section.

Figures 2, 3:
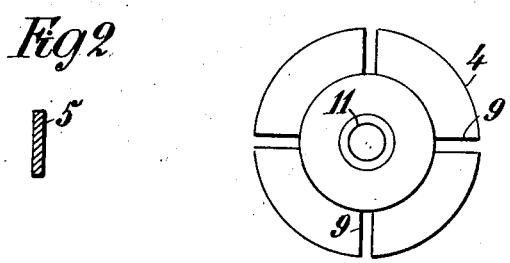

Fig. 2 a cross-section of the spring indicated in Fig. 1.

Fig. 3 one of the shafts in end-elevation, and

Figure 4:
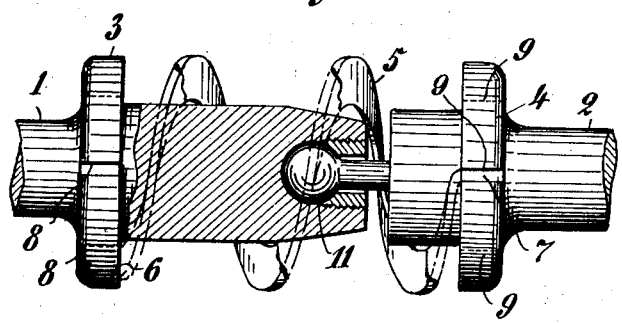

Fig. 4 a modified manner of guiding the shafts relatively to one another.

1 and 2 are the two shaft ends connected with one another by means of the universal coupling. At the two shaft ends there are provided collars or flanges 3 and 4 between which the members constituting the coupling are disposed. The connecting member between the shaft ends 1 and 2 is formed by two or more springs 5 of uniform size and shape, (only one of which is shown,) screwed into each other and ordinarily, attached to the shaft ends at uniform angular intervals equaling 360° divided by the number of springs. In the construction shown in Fig. 1 there are supposed to be used two or four springs 5 formed by helically wound spring-steel of a cross-section, as shown in Fig. 2 and fitted at both ends with lugs 6 and 7 bent so as to become parallel with the axis of the coupling when the springs are placed between the shaft ends, so that the lugs may be attached to the shaft ends by being inserted in notches 8 and 9 on the two collars. The more springs 5 there are used, the more the power to be transmitted through the coupling will be distributed on the springs and consequently, on a larger number of notches 8 and 9.

The springs 5 screwed into each other not only allow the shaft ends 1 and 2 to form a slight angle with one another, and to revolve through small angles relatively to one another but, unless the shafts are guided relatively to one another to permit rotation only, they also allow the shafts 1 and 2 to be moved somewhat parallel to one another and, finally, they allow the shaft ends to move somewhat toward or away from one another. Besides, the springs serve to transmit from the driven shaft, the more or less pulsative motion produced by the engine into a uniform steady revolution of the driven shaft.

In the construction shown, the shaft ends are guided relatively to one another by one shaft end 2 with a spherical surface 11 provided on a pin 10 extending into a cylindrical bore 12 in the shaft end 1, whereby the shafts are guided in their relative position, both in case they are moved axially and in case they are angularly displaced in relation to one another.

By another construction of the guiding for the shafts relatively to one another, the spherical surface 11 is more or less inclosed by a spherical seat located in a bore partly corresponding to the bore 12.

The joint 11—12 is preferably located approximately midway of the distance between the collars or flanges 3, 4 and thus the ends of the springs.

The guiding of the shafts relatively to one another and the manner of attaching the spring ends to the shafts may be varied widely, without deviation from the main principle underlying the present invention, viz., the use of a number of alike springs screwed into each other.

I claim:

1. In a universal shaft coupling, flanges secured to the adjacent ends of the shafts to be coupled; members secured to and extending from each of said flanges, one of said members being provided with a ball and the other of said members being provided with a socket for said ball, said socket being elongated to permit said members to move toward each other; and coil springs having their opposite ends secured to opposite flanges to connect said flanges for rotation of one by the other.

2. In a universal shaft coupling, flanges secured to the adjacent ends of the shafts to be coupled; members extending toward each other and from each of said flanges and a universal joint connecting said members at a point virtually midway of said flanges; and coil springs having their opposite ends secured to opposite flanges to connect said flanges for rotation of one by the other.

3. In a universal shaft coupling, heads secured to the adjacent ends of the shafts to be coupled; members extending toward each other and from each of said heads; and flat springs connecting said heads for rotation of one by the other, said heads having peripheral slots for the reception of the ends of said spring.

4. In combination, a pair of separate shafts the ends of which are adjacent each other; a separate head formed integral with each of said adjacent ends; a ball carried by one of said heads; a socket provided in the other head and into which the ball projects, said heads being spaced and said ball-and-socket joint being located virtually midway of said space; and a spring located in said space between said heads and having its opposite ends secured to the opposite head, for rotating one of said heads and shafts by the other.

In testimony whereof I affix my signature.

PEDER ANDERSEN FISKER.